United States Patent
Pan et al.

(10) Patent No.: US 12,468,500 B1
(45) Date of Patent: Nov. 11, 2025

(54) DIGITAL CONTENT PROJECTION USING SENSOR DATA

(71) Applicant: Motorola Mobility LLC, Chicago, IL (US)

(72) Inventors: Xuyuan Pan, Chicago, IL (US); Rohit Sisodia, Naperville, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 18/970,719

(22) Filed: Dec. 5, 2024

(51) Int. Cl.
*G06F 3/14* (2006.01)
*G06F 1/16* (2006.01)
*G06F 3/01* (2006.01)

(52) U.S. Cl.
CPC ............ *G06F 3/1454* (2013.01); *G06F 1/163* (2013.01); *G06F 3/017* (2013.01); *G06F 3/011* (2013.01)

(58) Field of Classification Search
CPC . G06F 1/163; G06F 3/011–017; G06F 3/1454
See application file for complete search history.

(56) References Cited

U.S. PATENT DOCUMENTS

| | | | | |
|---|---|---|---|---|
| 9,417,704 B1 * | 8/2016 | Smus | ....................... | G06F 3/017 |
| 9,563,280 B1 * | 2/2017 | Smus | ..................... | G06F 3/1454 |
| 9,791,940 B1 * | 10/2017 | Smus | ....................... | G06F 3/017 |
| 10,055,064 B2 * | 8/2018 | Tokutake | ............... | G06F 3/0481 |
| 10,203,763 B1 * | 2/2019 | Poupyrev | ................ | G06F 3/017 |
| 10,331,205 B2 * | 6/2019 | Kim | ........................ | G06F 3/017 |
| 10,534,429 B2 * | 1/2020 | Liu | ......................... | G06F 3/011 |
| 10,572,027 B2 * | 2/2020 | Poupyrev | ............... | G06F 1/1684 |
| 10,860,087 B2 * | 12/2020 | Kim | ........................ | G06V 10/10 |
| 10,912,136 B2 * | 2/2021 | Foster | ..................... | G06F 3/016 |
| 11,003,277 B2 * | 5/2021 | Liu | ........................ | G06F 3/1423 |
| 11,120,630 B2 * | 9/2021 | Choi | ....................... | G06F 3/011 |
| 11,145,126 B1 * | 10/2021 | Bramwell | ............... | G06F 3/147 |
| 11,353,707 B2 * | 6/2022 | Kim | ........................ | G06F 3/017 |
| 11,483,673 B2 * | 10/2022 | Lee | ........................ | H04W 4/026 |
| 11,644,902 B2 * | 5/2023 | Zhang | ..................... | G06F 3/017 |
| | | | | 345/157 |
| 11,914,153 B2 * | 2/2024 | Kim | ........................ | G06V 10/20 |
| 12,117,619 B1 * | 10/2024 | Casarez | ............... | H04N 23/611 |
| 12,131,090 B1 * | 10/2024 | Anderson | ................ | G06F 3/14 |
| 12,197,549 B2 * | 1/2025 | Alameh | .................. | G06F 21/32 |
| 2006/0028429 A1 * | 2/2006 | Kanevsky | ............... | G06F 3/011 |
| | | | | 345/156 |

(Continued)

*Primary Examiner* — Patrick F Marinelli
(74) *Attorney, Agent, or Firm* — FIG. 1 Patents

(57) ABSTRACT

In aspects of digital content projection using sensor data, a first device obtains first data and second data using one or more sensors. The first device establishes a wireless connection with a second device. The first device transmits first signaling via the wireless connection based on the first data. The first signaling indicates for the second device to initiate sharing of digital content. The first device transmits second signaling via the wireless connection based on the second data. The second signaling indicates for the second device to transmit the digital content to a third device based on initiating the sharing of the digital content. In some examples, the first signaling and the second signaling include the first data and the second data. The second device establishes a wireless connection with the third device to initiate the sharing of the digital content and to transmit the digital content.

20 Claims, 10 Drawing Sheets

(56) References Cited

U.S. PATENT DOCUMENTS

| | | | |
|---|---|---|---|
| 2008/0152263 A1* | 6/2008 | Harrison | H04W 4/80 382/313 |
| 2008/0174547 A1* | 7/2008 | Kanevsky | G06F 3/017 345/156 |
| 2011/0283334 A1* | 11/2011 | Choi | H04L 67/148 725/148 |
| 2014/0009394 A1* | 1/2014 | Lee | G06F 3/1454 345/157 |
| 2014/0258880 A1* | 9/2014 | Holm | G06F 3/0488 715/748 |
| 2015/0020081 A1* | 1/2015 | Cho | H04M 1/724 719/318 |
| 2016/0109937 A1* | 4/2016 | Kim | G02B 27/0172 345/156 |
| 2016/0124579 A1* | 5/2016 | Tokutake | G06F 3/0481 345/156 |
| 2016/0301791 A1* | 10/2016 | Kim | G06F 1/1626 |
| 2018/0196510 A1* | 7/2018 | Liu | H04W 76/10 |
| 2018/0198783 A1* | 7/2018 | Liu | H04W 76/10 |
| 2019/0138109 A1* | 5/2019 | Poupyrev | G06F 3/017 |
| 2019/0265780 A1* | 8/2019 | Kim | G06F 1/163 |
| 2020/0092925 A1* | 3/2020 | Foster | G06T 19/00 |
| 2021/0048678 A1* | 2/2021 | Kim | G06F 3/0483 |
| 2022/0171466 A1* | 6/2022 | Zhang | G06F 3/147 |
| 2024/0019938 A1* | 1/2024 | Whitmire | G06F 3/016 |
| 2024/0028129 A1* | 1/2024 | Whitmire | G06F 1/163 |
| 2024/0302665 A1* | 9/2024 | Kim | G06F 3/0483 |

\* cited by examiner

DIGITAL CONTENT PROJECTION USING SENSOR DATA

BACKGROUND

Devices, such as smart devices, mobile devices (e.g., cellular phones, tablet devices, smartphones), consumer electronics, wearable devices, and the like, can be implemented for use in a wide range of environments and for a variety of different applications. A device can include or implement one or more applications and services. For example, the applications and services may include functionality for digital content projection, which includes transmitting and displaying digital content from a source device to a target device. Example target devices include, but are not limited to, televisions, computer monitors, projector screens, and any other devices that include a digital display. Examples of digital content that may be projected include, but are not limited to, application content, video content, image content, audio content, and documents, among other examples.

BRIEF DESCRIPTION OF THE DRAWINGS

Implementations of the techniques for digital content projection using sensor data are described with reference to the following Figures. The same numbers may be used throughout to reference like features and components shown in the Figures.

DETAILED DESCRIPTION

Figure 1:
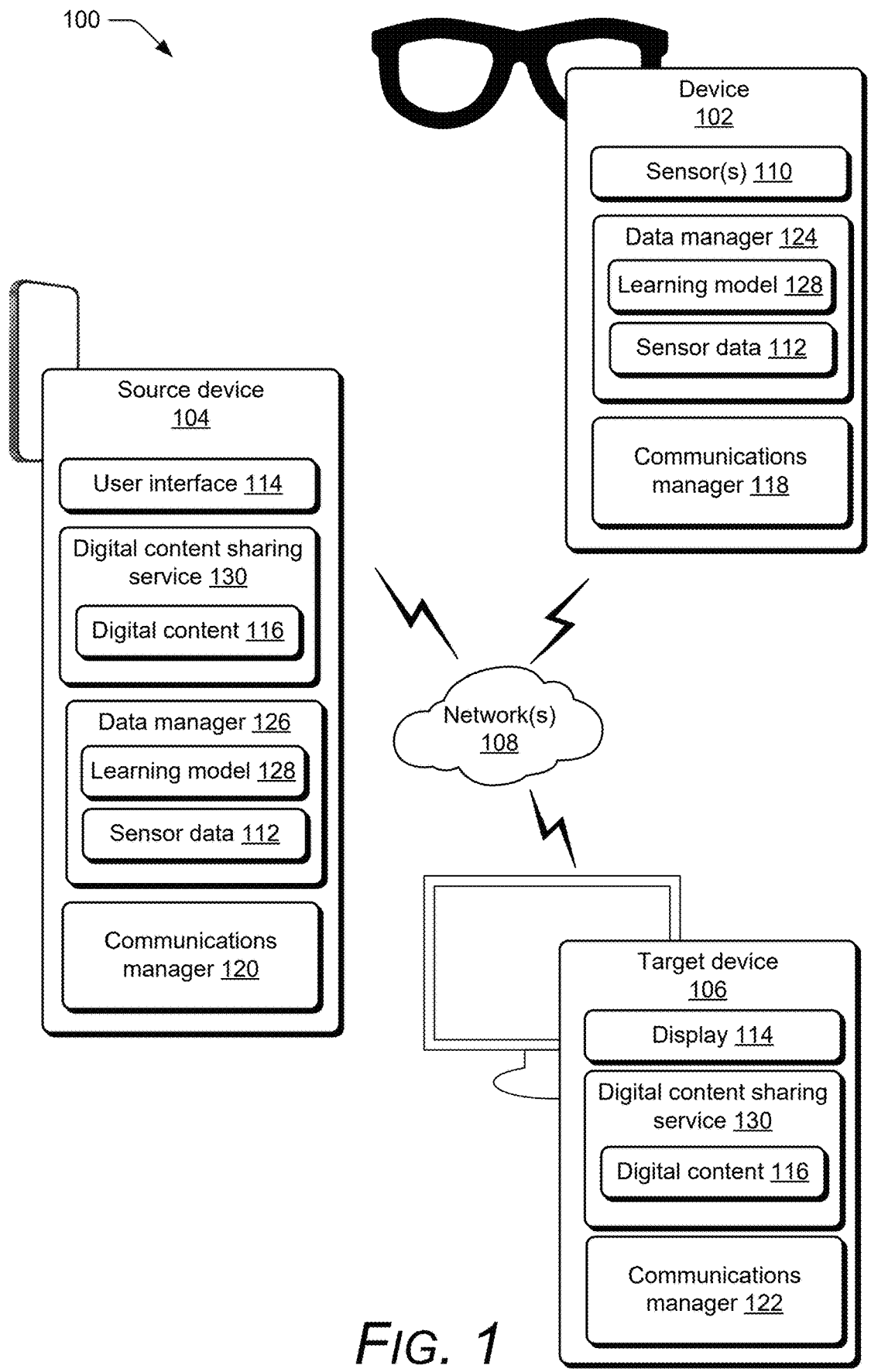
FIGS. 1 and 2 illustrate example systems for digital content projection using sensor data in accordance with one or more implementations as described herein.

Implementations of techniques for digital content projection using sensor data are described herein. In some examples, a device (e.g., a mobile device, a client device, a wearable device, or any other device) can implement one or more applications or services. For example, the device implements one or more applications or services that project (transmit, transfer, output, display, etc.) digital content from the device or from another device, referred to as a source device, to a different device, referred to as a target device. In conventional processes for digital content projection between devices, a source device receives input via a user interface of the source device that triggers or initiates projection of the content to the target device. The source device transmits the digital content to the target device for display at the target device.

Conventional techniques for digital content projection may be handled on the source device via an application interface (through touch input, mouse, keyboard, etc.), which may not be intuitive for a user. Further, conventional techniques for digital content projection introduce latency between receiving the input indicating for the source device to project the digital content via a target device and displaying the digital content at the target device. For example, the latency may be due to processing the input, as well as encoding, transmission, and decoding of the digital content. Additionally, or alternatively, conventional techniques may not provide for compatibility across different devices and platforms, leading to complex setup processes (e.g., inefficient use of processing and memory resources), reduced functionality, or even failure to establish a connection between devices. Furthermore, conventional techniques for digital content projection may not provide data security, such that digital content and/or data related to the source device or target device may be vulnerable to interception or unauthorized access.

As described herein, to reduce latency, improve resource usage, and enhance data security for projecting digital content, a device may utilize sensor data to initiate and control digital content sharing between devices, including a source device and a target device. The described techniques provide for improved user experience, as the initiation and control of the digital content sharing is performed via both the source and target devices with the aid of a device that collects sensor data (e.g., which could be the source device or different from the source device). Implementing a device that collects sensor data may be more intuitive for a user, as the user may perform one or more gestures that indicate for the source device and/or the target device to initiate and control the digital content sharing. In some cases, the device and/or the source device may implement one or more learning models to determine whether one or more trigger conditions are met by the sensor data. The device collects the sensor data using one or more sensors (e.g., camera sensors, audio sensors, motion detection sensors, and accelerometers, among other examples). If one or more trigger conditions are met, then the source device may initiate and control the digital content sharing, accordingly. For example, if the sensors are cameras and the sensor data includes image data and/or video data of a user performing one or more gestures, then the learning models may classify the gestures into different trigger conditions (e.g., a first gesture triggers initiation of the content sharing, a second gesture triggers the transmission of the digital content to a target device, and a third gesture triggers confirmation that the digital content sharing is successful). In some examples, the device that includes or implements the sensors may be a different device than the source device. In some other examples, the source device may include or implement the sensors.

Analyzing sensor data to determine whether to project digital content from a source device to a target device eliminates user interaction with a user interface of a source device to initiate and control projecting digital content, which reduces latency by reducing or eliminating displaying the user interface and processing input responsive to interaction with the user interface. Additionally, or alternatively, a device processing the sensor data locally at the device collecting the sensor data (e.g., rather than transmitting the raw sensor data over a network) reduces opportunities for unauthorized interception of the sensor data. Additionally, or alternatively, the use of trained learning models to detect and implement trigger conditions for projecting digital content may provide for compatibility across different devices and platforms. For example, the learning models may be trained to recognize gestures or other sensor data that is common across various device types, which provides for digital content projection between different types of source devices and target devices without device-specific implementations. The learning models may adapt to sensor capabilities of various devices, enabling consistent functionality if sensors differ.

While features and concepts of the described techniques for digital content projection using sensor data can be implemented in any number of different devices, systems, environments, and/or configurations, implementations of the techniques for digital content projection using sensor data are described in the context of the following example devices, user interfaces, systems, and methods.

FIG. 1 illustrates an example system 100 for digital content projection using sensor data, as described herein. The example system 100 includes a device 102, a source device 104, and a target device 106, where the device 102, the source device 104, and the target device 106 are inter-connectable via one or more networks 108. Although the system 100 illustrates the device 102 and the source device 104 as being separate the devices, in some examples, the device 102 and the source device 104 are a single device (e.g., a same device) and/or are collocated devices. The target device 106 may be remote from or independent of the source device 104 (e.g., in a different physical location than the source device 104, not collocated). A device 102, a source device 104, and a target device 106 may range from a full resource device with substantial memory and processor resources to a low-resource device with reduced memory and/or processing resources. Although in instances in the following discussion reference is made to a device 102, a source device 104, and a target device 106, respectively, in the singular, a device 102, a source device 104, and a target device 106 may also be representative of multiple different devices. The device 102, a source device 104, and a target device 106 may include one or more features in addition to, or as an alternative to, the features illustrated in the system 100.

In some examples, the device 102 is an example of a smartphone, a mobile phone, a wireless device, a mobile device, a wearable device, a device mounted (e.g., fixed) in an environment, and/or any other type of device. Wearable devices may include a variety of form factors and functionalities designed to be worn on or close to a body of a user. Examples of wearable devices may include smartwatches, pins, fitness trackers, smart glasses, smart jewelry (rings, necklaces, earrings, etc.), smart clothing (e.g., shirts or shoes with embedded sensors), head-mounted displays, cameras, smart earbuds, and health monitoring devices, among other examples. The device 102 can be implemented with various components, such as a processor system and memory, as well as any number and combination of different components as further described with reference to the example device shown in FIG. 10. The device 102 may incorporate various sensors 110, such as accelerometers, gyroscopes, heart rate monitors, global positioning system (GPS) receivers, and cameras. The sensors 110 provide for the device 102 to collect (e.g., obtain, receive) sensor data 112. In some cases, the device 102 may collect sensor data 112 for initiating and controlling digital content sharing between a source device 104 and a target device 106. For example, a smartwatch may detect gesture-based commands (e.g., trigger conditions) through motion sensors. In some other examples, smart glasses may use camera sensors to recognize visual cues or gestures, enabling users to trigger content projection without directly interacting with a user interface 114 of the source device.

In some examples, the source device 104 includes a server device, a smartphone, a mobile phone, and/or any other type of wireless device or mobile device. The source device 104 can be implemented with various components, such as a processor system and memory, as well as any number and combination of different components as further described with reference to the example device shown in FIG. 10. The source device 104 may include a user interface 114 for displaying digital content 116. Digital content 116 may refer to information or media that is created, stored, transmitted, or displayed in a digital format. Examples of digital content may include, but are not limited to, text files, images, videos, audio recordings, animations, web pages, applications, games, e-books, presentations, spreadsheets, and databases, among other media types that can be shared between devices (e.g., the source device 104 and the target device 106). For example, the source device 104 (e.g., a mobile phone) may project a photo album to the target device 106 (e.g., a smart television). Additionally, or alternatively, the source device 104 (e.g., a tablet) may stream a video to a target device 106 (e.g., a projector). Additionally, or alternatively, the source device 104 (e.g., a laptop) may display a presentation to a target device 106 (e.g., a monitor). The digital content 116 may include real-time or near real-time data streams, such as live video feeds or image feeds from a camera or continuously updated information from sensors 110 or online sources.

In one or more implementations, the device 102, the source device 104, and the target device 106 include various radios for wireless communication (e.g., via the networks 108). For example, the device 102, the source device 104, and the target device 106 may include a Bluetooth (BT) and/or Bluetooth Low Energy (BLE) transceiver and/or a near field communication (NFC) transceiver. The device 102, the source device 104, and the target device 106 can also include a Wi-Fi radio, a GPS radio, and/or any type of device communication interfaces (e.g., for ultra-wide band (UWB) communication). UWB is a short-range, high-bandwidth wireless communication protocol that operates by transmitting ultra-short pulses over a wide spectrum of frequencies. The device 102, the source device 104, and the target device 106 may use UWB communication to establish high-speed, low-latency connections for rapid data transfer and precise device localization. For example, the device 102, the source device 104, and/or the target device 106 may use UWB communication to provide centimeter-level accuracy in determining relative positions between devices to enhance gesture recognition capabilities. UWB communication provides for relatively precise (e.g., greater than a threshold precision) interpretation of user intentions when initiating content sharing. Additionally, or alternatively, the relatively high data transfer rates (e.g., greater than a threshold data transfer rate) may facilitate faster transmission of digital content 116 between devices, particularly for large files or high-resolution media. The use of UWB communication may also improve data security, as the short range and directional UWB transmissions are difficult to intercept. In some examples, the device 102 may implement a communications manager 118 for the wireless communication, the source device 104 may implement a communications manager 120 for the wireless communication, and the target device 106 may implement a communications manager 122 for the wireless communication.

The communications manager 118, the communications manager 120, and the communications manager 122 may facilitate the establishment and maintenance of wireless connections between the device 102, the source device 104, and the target device 106 for digital content projection. At the source device 104, the communications manager 120 may handle an initial connection setup with the device 102, receive and interpret signaling based on sensor data 112, and establish a connection with the target device 106 for content transmission. The communications manager 120 may also manage the encoding and transmission of digital content 116 to the target device 106. The communications manager 122 at the target device 106 may be responsible for accepting incoming connection requests from the source device 104, receiving and decoding the transmitted digital content 116, and coordinating display or playback of the digital content 116. At the device 102, the communications manager 118 may establish and maintain the connection with the source device 104, control the exchange of sensor data 112 between the device 102 and the source device 104, and transmit signaling based on detected trigger conditions. The communications manager 118, the communications manager 120, and the communications manager 122 may implement security protocols to ensure encrypted and authenticated data transfer, manage bandwidth allocation, and handle any network-related issues or disconnections. Additionally, or alternatively, the communications manager 118, the communications manager 120, and the communications manager 122 may coordinate with other device components, such as a data manager 124 at the device 102 and a data manager 126 at the source device 104, to enable seamless content projection according to detected trigger conditions.

In some examples, the data manager 124 at the device 102 may collect and process sensor data 112 from various sensors 110, such as cameras, microphones, accelerometers, and motion detectors. The data manager 124 may implement a learning model 128 to analyze the sensor data 112 and classify the sensor data 112 into different trigger conditions for digital content projection. The learning model 128 at the device 102 may be trained to recognize gestures, voice commands, or other sensor inputs that correspond to different stages of content sharing. When a trigger condition is detected, the data manager 124 may generate signaling that indicates respective stages of the content sharing to be sent to the source device 104 via the communications manager 118.

At the source device 104, the data manager 126 may receive and interpret the stage of the content sharing using the signaling from the device 102. Additionally, or alternatively, the device 102 may transmit the sensor data 112 to the source device 104. The source device 104 may implement the learning model 128 to process the sensor data 112. The learning model 128 (e.g., implemented by the device 102 and/or the source device 104) may be trained to detect trigger conditions for initiating, controlling, and terminating the digital content projection using the sensor data 112. For example, the data manager 124 and/or the data manager 126 may provide the sensor data 112 as input to the learning model 128, and the learning model 128 may output detection of one or more trigger conditions that indicate for the source device 104 to establish a connection with the target device 106, to begin transmitting the digital content 116, if the digital content 116 is successfully projected to the target device 106, and/or to end (e.g., terminate, cancel) the projection session.

In some cases, the data manager 124 and the data manager 126 continuously update and refine the learning model 128 according to user interactions and feedback, which provides for improved accuracy in detecting trigger conditions and adapting to different devices, users, or environments. The data manager 124 and the data manager 126 may also implement data security measures, such as local processing of sensor data 112 to minimize transmission of raw data and may handle the encoding and encryption of any data to be shared between devices. By utilizing the learning model 128 and sensor data 112, the data manager 124 and the data manager 126 enable secure digital content projection without relying on interactions with the user interface 114.

The learning model 128 may be a machine learning algorithm or neural network designed to analyze and classify sensor data 112 into categories that correspond to trigger conditions for digital content projection. The learning model 128 may be trained on diverse datasets including various types of sensor inputs, such as image data of gestures, audio data of voice commands, or motion data from accelerometers. The training process may involve supervised learning, where the learning model 128 is presented with labeled examples of sensor data 112 corresponding to different trigger conditions. For example, the learning model 128 may be trained on a dataset of gesture images labeled with their respective actions (e.g., "initiate sharing," "transmit content," "confirm successful sharing"). During training, the learning model 128 may learn to extract relevant features from the sensor data 112 and map the features to respective trigger conditions. The training process may include multiple iterations, with a performance of the learning model 128 being evaluated and refined using techniques, such as cross-validation and hyperparameter tuning. In some cases, transfer learning techniques may be employed, where a pre-trained model is fine-tuned for specific device types or user preferences. For example, the training may include classifying a sweeping hand gesture captured by a camera as a trigger to initiate content sharing, interpreting a specific voice command detected by a microphone as an instruction to transmit content to a target device 106, or recognizing a series of taps on an accelerometer as a confirmation to end a sharing session. The learning model 128 may also adapt to different sensor capabilities across devices, providing for the learning model 128 to maintain consistent functionality when processing data from varied sensor types or resolutions.

The source device 104 and the target device 106 may implement a digital content sharing service 130 for projecting the digital content 116 from the source device 104 to the target device 106. A digital content sharing service 130 may be a software component or application that facilitates the transmission, reception, and display of digital content 116 between devices. The digital content sharing service 130 may handle various aspects of content sharing, including content selection, format conversion, streaming protocols, and synchronization between devices. At the source device 104, the digital content sharing service 130 may be responsible for accessing and preparing the digital content 116 for transmission, which may involve tasks such as encoding video streams, compressing images, or packaging application data. The digital content sharing service 130 may also manage user permissions and content access rights to ensure that authorized content is shared. The implementation of the digital content sharing service 130 at the target device 106 may include receiving, decoding, and rendering the digital content 116, such as buffering incoming data streams, decoding compressed media, and adapting the content display to screen size and capabilities of the target device 106. The digital content sharing service 130 may also handle any interactive elements of the shared content, providing for user input at the target device 106 to be relayed back to the source device 104.

For example, a smartphone may use the digital content sharing service 130 to stream a locally stored video to a smart television, automatically adjusting the video quality based on the network conditions. Additionally, or alternatively, a laptop may leverage the digital content sharing service 130 to project a presentation onto a conference room display, providing for real-time annotations from the presenter. Additionally, or alternatively, a tablet may use the digital content sharing service 130 to mirror displayed content onto a larger monitor, enabling seamless continuation of work across devices. The digital content sharing service 130 may integrate with cloud storage platforms, providing for devices to share content that is stored remotely, expanding the range of shareable content beyond what is locally available at the source device 104.

In some examples, the trigger conditions for projecting the digital content 116 from the source device 104 to the target device 106 may depend on a type of the device 102, a type of the source device 104, and/or a type of the target device 106. For example, different device types have different capabilities and components, including different sensors 110, different locations of the sensors 110, different processing capabilities, and different memory capabilities, among other examples. The trigger conditions (e.g., categories of sensor data 112 that trigger different aspects of projecting the digital content 116) may be configured or defined for the different device types. For example, the trigger conditions may be set or otherwise specified by input (e.g., via a user interface 114 of the source device 104 or another device). In some other examples, the trigger conditions may be consistent (e.g., the same) for the different device types.

The device 102, which may be a wearable device like smart glasses, utilizes sensors 110 to capture sensor data 112, enabling intuitive and hands-free control of content sharing. This approach reduces latency by eliminating direct interaction with the user interface 114 of the source device 104. The data manager 124 and learning model 128 implemented by the device 102 process and analyze the sensor data 112 locally, enhancing data security by minimizing the transmission of raw sensor information over networks 108. The digital content sharing service 130 at the source device 104 works in conjunction with the data manager 126 and the learning model 128 to interpret signals including sensor data 112 from the device 102, facilitating seamless initiation and control of content sharing. This distributed processing approach optimizes resource usage across devices. The communications manager 118, the communications manager 120, and the communications manager 122 ensure efficient and secure data transfer, while also providing compatibility across different device types and platforms. The digital content sharing service 130 enables smooth reception and display of shared content at the target device 106, adapting to various display capabilities. The system 100 offers a more intuitive, secure, and efficient method for projecting digital content 116 from the source device 104 to the target device 106, enhancing user experience and expanding the possibilities for seamless content sharing across diverse devices and environments.

Figure 2:
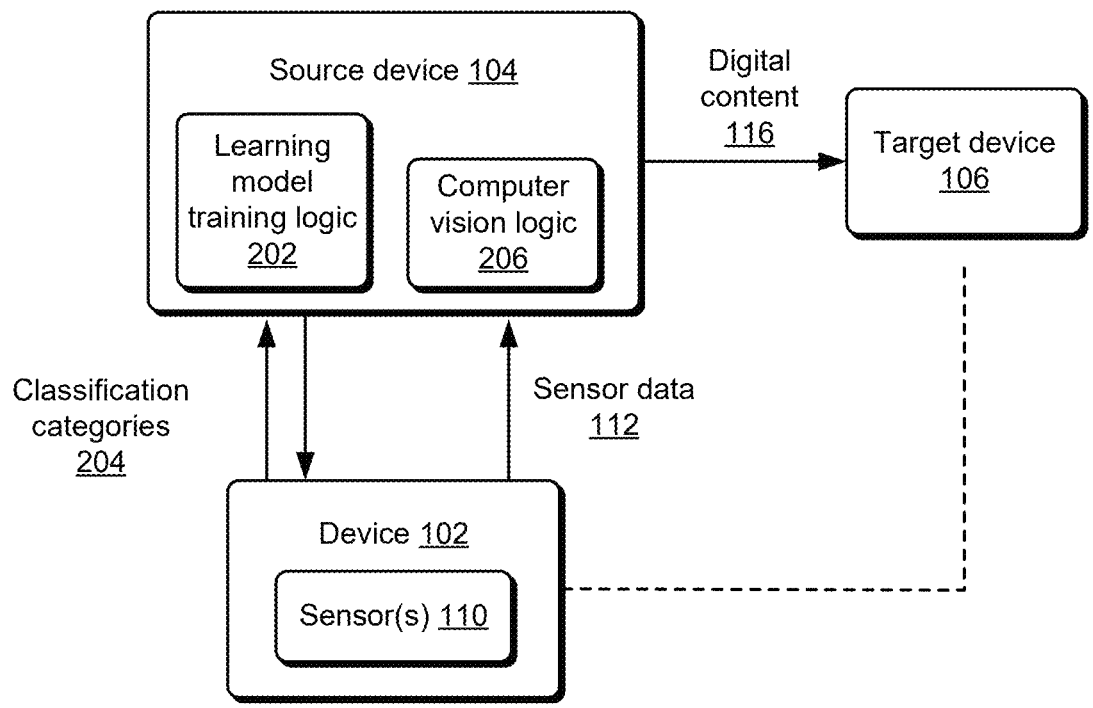

FIG. 2 illustrates an example system 200 for digital content projection using sensor data in accordance with one or more implementations as described herein. The example system 200 may implement aspects of the example system 100. For example, the example system 200 can be implemented by a device 102 with one or more sensors 110, a source device 104, and a target device 106 to facilitate projection of digital content 116 to the target device 106 using sensor data 112, where the device 102, the source device 104, the target device 106, the digital content 116, and the sensor data 112, may be examples of the corresponding devices as described with reference to FIG. 1.

In some examples, the device 102 captures (e.g., collects, obtains, receives) sensor data 112 using one or more sensors 110 at the device 102. The device 102 may transmit the sensor data 112 to the source device 104 for processing. In some other examples, the device 102 processes the sensor data 112. For example, the device 102 and/or the source device 104 may provide the sensor data 112 as input to a learning model and may receive a classification of the sensor data 112 into one or more trigger conditions for projecting digital content 116, as described with reference to FIG. 1.

The source device 104 may implement learning model training logic 202 to train and refine one or more learning models (e.g., one or more learning models 128, as described with reference to FIG. 1) for classifying sensor data 112 into trigger conditions for digital content projection. The learning model training logic 202 may collect diverse datasets of sensor inputs, such as image data of gestures, audio data of voice commands, or motion data from accelerometers, along with corresponding labels indicating the associated trigger conditions. Through supervised learning techniques, among other example training techniques, the learning model training logic 202 may iteratively update the parameters (e.g., weights, biases) of the learning models to improve a capability of the learning model to map features of the sensor data 112 to trigger conditions. The training process may involve techniques, such as cross-validation and hyperparameter tuning to improve a performance of the learning models. Additionally, or alternatively, the learning model training logic 202 may implement transfer learning, providing for a pre-trained learning model to be fine-tuned for device types or user preferences, enhancing adaptability across different hardware configurations. Although the learning model training logic 202 is described as being implemented by the source device 104, the learning model training logic 202 may additionally, or alternatively, be implemented by the device 102. In some examples, the source device 104 may train one or more learning models, and may transmit the learning models to the device 102. Additionally, or alternatively, the source device 104 may implement the learning models.

In some examples, during the learning model training process, the source device 104 and/or the device 102 may determine one or more classification categories 204. The classification categories 204 may include the various trigger conditions that the learning model is trained to recognize from the sensor data 112. The classification categories 204 may correspond to actions for the source device 104 to perform, such as initiating sharing of the digital content 116 to the target device 106, transmitting the digital content 116 to the target device 106, confirming successful sharing of the digital content 116 with the target device 106 (e.g., and terminating display of the digital content 116 at the source device 104), and terminating sharing of the digital content 116 with the target device 106. The learning model training logic 202 may obtain the classification categories 204 from predefined sets of user interactions relevant to digital content projection, or through analysis of user behavior patterns. The classification categories 204 may include different actions, movements, gestures, voice commands, or other categories of sensor data. For example, the classification categories 204 may include a sweeping hand gesture category for initiating content sharing, a pointing gesture category for selecting a target device, or a thumbs up gesture category for confirming successful projection. Example classification categories 204 and corresponding trigger conditions are described in further detail with respect to FIGS. 4 and 5.

Computer vision logic 206 may be implemented by the source device 104 or the device 102 to process and interpret visual data captured by camera sensors. In some examples, the computer vision logic 206 may analyze image or video data to detect and recognize gestures or visual cues that serve as trigger conditions for digital content projection. The computer vision logic 206 may implement techniques, such as image segmentation, feature extraction, and pattern recognition, to identify relevant gestures or objects in the visual input. For example, the computer vision logic 206 may detect movements of a hand of a user to recognize a pinch and drag gesture for initiating content sharing, identify a television screen in a field of view of the camera as a potential target device 106 for projection. The computer vision logic 206 may work in conjunction with the learning models, providing processed visual data as input for classification into specific trigger conditions.

Figure 3:
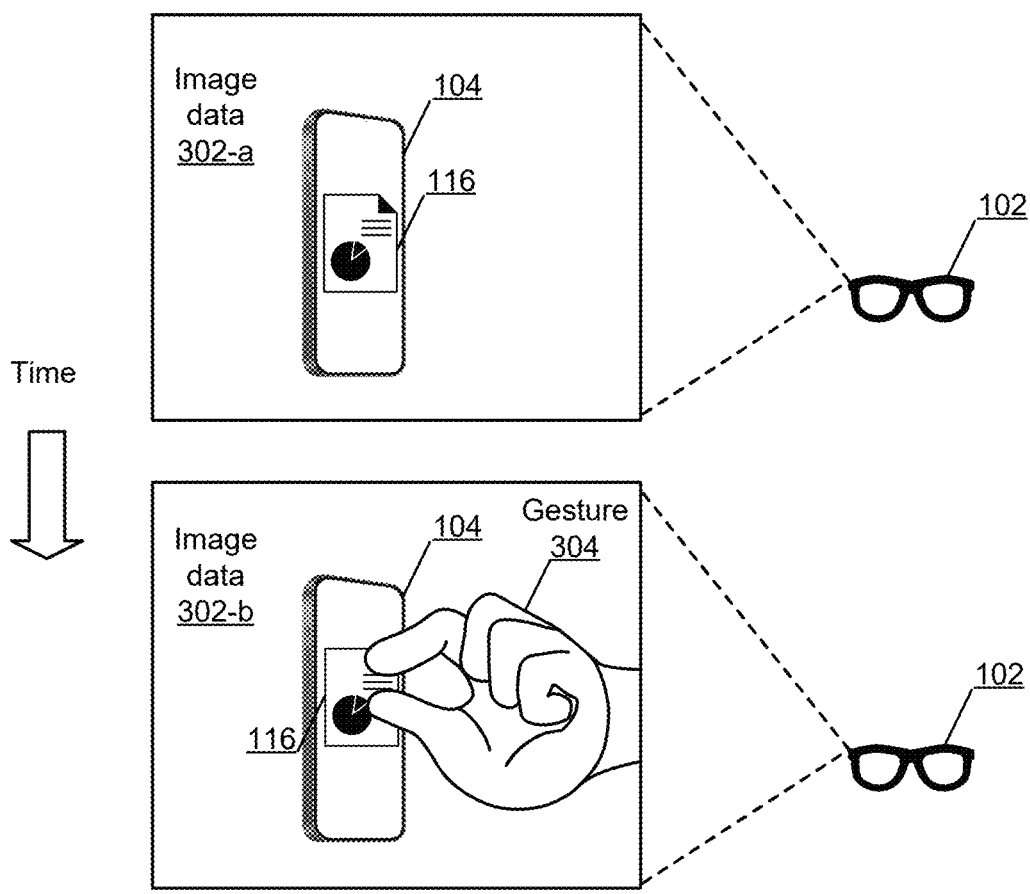
FIGS. 3 and 4 illustrate example sensor data diagrams for digital content projection using sensor data in accordance with one or more implementations as described herein.

FIG. 3 illustrates an example sensor data diagram 300 for digital content projection using sensor data in accordance with one or more implementations as described herein. The sensor data diagram 300 may implement aspects of the example system 100 and/or the example system 200, as shown and described with reference to FIGS. 1 and 2. The example sensor data diagram 300 may include a device 102 that collects sensor data (e.g., sensor data 112, as described with reference to FIGS. 1 and 2) for detecting triggering conditions for projecting digital content 116 from a source device 104 to a target device, where the device 102, the digital content 116, and the source device 104 are examples of the corresponding devices and features as described with reference to FIGS. 1 and 2.

The sensor data diagram 300 illustrates a sequence of events for digital content projection using sensor data. In some examples, the sensor data includes image data, such as the image data 302-a and the image data 302-b. For example, the device 102 may include one or more camera sensors that capture the image data 302-a and the image data 302-b. The device 102 may capture an image of a source device 104 displaying digital content 116, as illustrated in the image data 302-a. In at least one implementation, the image data 302-a may include an indication of a user focus on the source device 104 (e.g., that a user gaze direction is directed toward the source device 104). The device 102 may provide the image data 302-a as input to one or more learning models and/or to computer vision logic to analyze the image data 302-a. The learning models and/or the computer vision logic may provide output that indicates a presence of the source device 104. Additionally, or alternatively, the device 102 may detect the source device 104 through an established wireless connection, such as via Bluetooth, UWB, or Wi-Fi.

The device 102 may capture image data 302-b that includes a gesture 304 performed by a user (e.g., a user of the device 102 or a user in the vicinity of the device 102). The device 102 utilizes one or more learning models and/or computer vision logic to analyze the image data 302-b and classify the gesture 304 as a trigger condition for digital content projection. For example, the gesture 304 may be classified as an instruction to initiate sharing of the digital content 116 from the source device 104 to a target device 106. The gesture 304 may be an example of a pinch gesture, or any other gesture performed by the user.

In some examples, the source device 104 may implement the one or more learning models and/or computer vision logic to analyze the image data 302-a and the image data 302-b (e.g., in addition to, or as an alternative to, the device 102 implementing the learning models and/or computer vision logic). The device 102 may have reduced capabilities (e.g., memory, storage, processing capabilities) when compared with the source device 104. Thus, the device 102 may capture the image data 302-a and image data 302-b and transmit the raw sensor data to the source device 104 via a wireless connection, and the source device 104 may process the raw sensor data. For example, the source device 104 may use the learning models to process the image data 302-a and image data 302-b, detect the source device 104 in the image data 302-a or via the wireless connection, and classify the gesture 304 in the image data 302-b.

Figure 4:
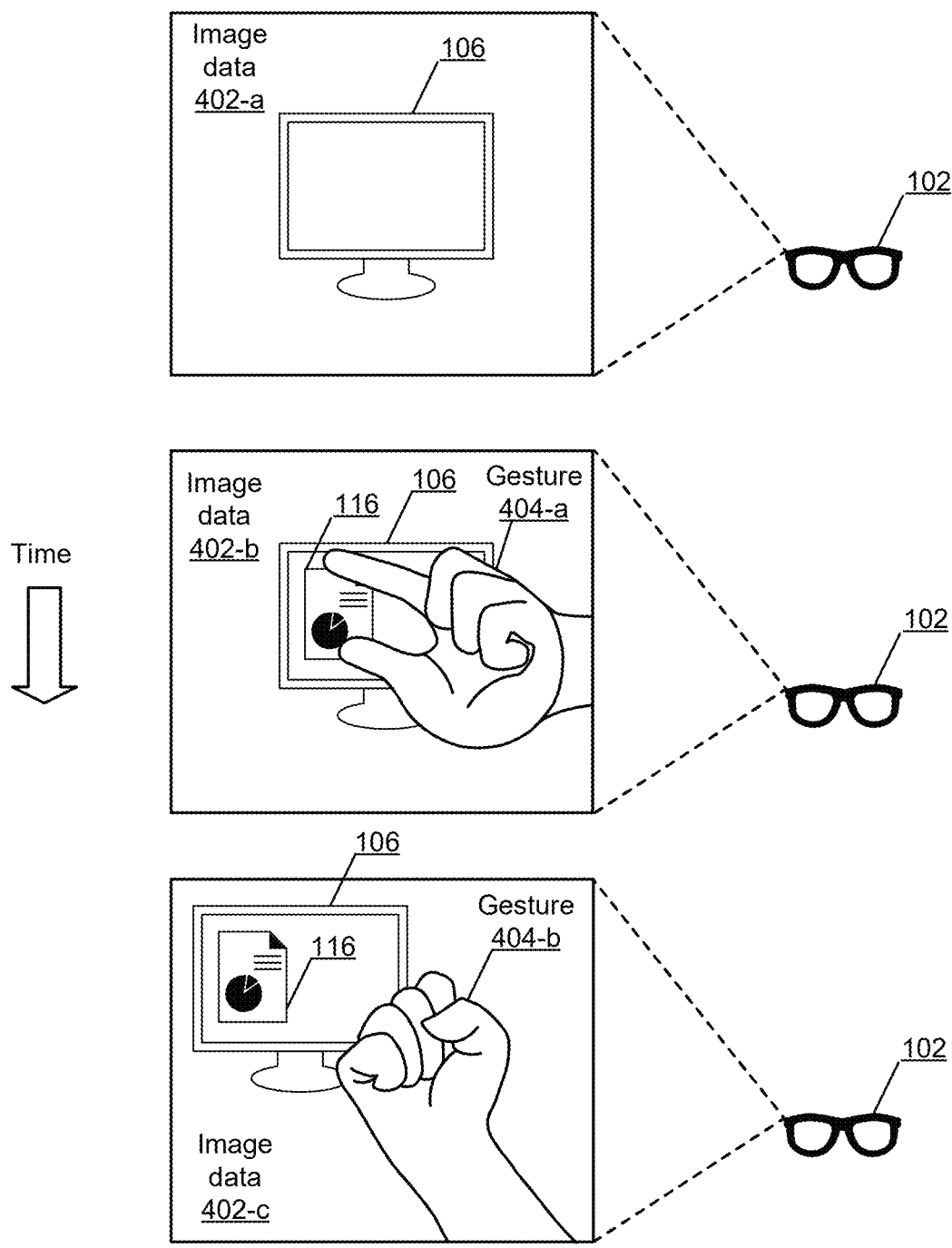

FIG. 4 illustrates an example sensor data diagram 400 for digital content projection using sensor data in accordance with one or more implementations as described herein. The sensor data diagram 400 may implement aspects of the example system 100, the example system 200, and/or the example sensor data diagram 300, as shown and described with reference to FIGS. 1 through 3. The example sensor data diagram 400 may include a device 102 that collects sensor data (e.g., sensor data 112, as described with reference to FIGS. 1 and 2) for detecting triggering conditions for projecting digital content 116 from a source device to a target device 106, where the device 102, the digital content 116, and the target device 106 are examples of the corresponding devices and features as described with reference to FIGS. 1 through 3.

The sensor data diagram 400 illustrates a sequence of events for digital content projection using sensor data. In some examples, the sensor data includes image data, such as image data 402-a, image data 402-b, and image data 402-c. For example, the device 102 may include one or more camera sensors that capture the image data 402-a, the image data 402-b, and the image data 402-c. The device 102 may capture an image of a target device 106, as illustrated in the image data 402-a. In at least one implementation, the image data 402-a may include an indication of a user focus on the target device 106 (e.g., that a user gaze direction is directed toward the target device 106). The device 102 may provide the image data 402-a as input to one or more learning models and/or to computer vision logic to analyze the image data 402-a. The learning models and/or the computer vision logic may provide output that indicates a presence of the target device 106. Additionally, or alternatively, the device 102 may detect the target device 106 through an established wireless connection with the target device 106 or with a source device, such as via Bluetooth, UWB, or Wi-Fi. For example, the source device may detect the target device 106 and may transmit an indication of the target device 106 to the device 102.

The device 102 may capture image data 402-b that includes a gesture 404-a performed by a user (e.g., a user of the device 102 or a user in the vicinity of the device 102). The device 102 utilizes one or more learning models and/or computer vision logic to analyze the image data 402-b and classify the gesture 404-a as a trigger condition for digital content projection. For example, the gesture 404-a may be classified as an instruction to transmit the digital content 116 from a source device to the target device 106. The gesture 404-a may be an example of a release (e.g., drop) gesture, or any other gesture performed by the user. Similarly, the device 102 may capture image data 402-*c* that includes a gesture 404-*b*. The device 102 may analyze the image data 402-*c* using the learning models and/or computer vision logic to classify the gesture 404-*b* as another trigger condition, such as an instruction to confirm or complete the sharing of the digital content 116. For example, the gesture 404-*b* may be an example of a first gesture performed by a user, which indicates that the projection of the digital content 116 to the target device 106 is complete. The gesture 404-*b* may additionally, or alternatively, be an example of an okay gesture with a hand of the user, a series of taps on the sensors, a motion of the sensors, or any other classifiable (e.g., detectable) sensor input. In some cases, the device 102 may determine that the projection of the digital content 116 is complete from analyzing the image data 402-*b* to determine whether the target device 106 is displaying the digital content 116 (e.g., in addition to, or as an alternative to, detecting an additional gesture, including the gesture 404-*b*).

In some examples, a source device may implement the one or more learning models and/or computer vision logic to analyze the image data 402-*a*, image data 402-*b*, and image data 402-*c* (e.g., in addition to, or as an alternative to, the device 102 implementing the learning models and/or computer vision logic). The device 102 may have reduced capabilities (e.g., memory, storage, processing capabilities) when compared with the source device. Thus, the device 102 may capture the image data 402-*a*, image data 402-*b*, and image data 402-*c* and transmit the raw sensor data to the source device via a wireless connection, and the source device may process the raw sensor data. For example, the source device may use the learning models to process the image data 402-*a*, image data 402-*b*, and image data 402-*c*, detect the target device 106 in the image data 402-*a* or via the wireless connection, and classify the gestures 404-*a* and 404-*b* in the image data 402-*b* and image data 402-*c*, respectively.

Figure 5:
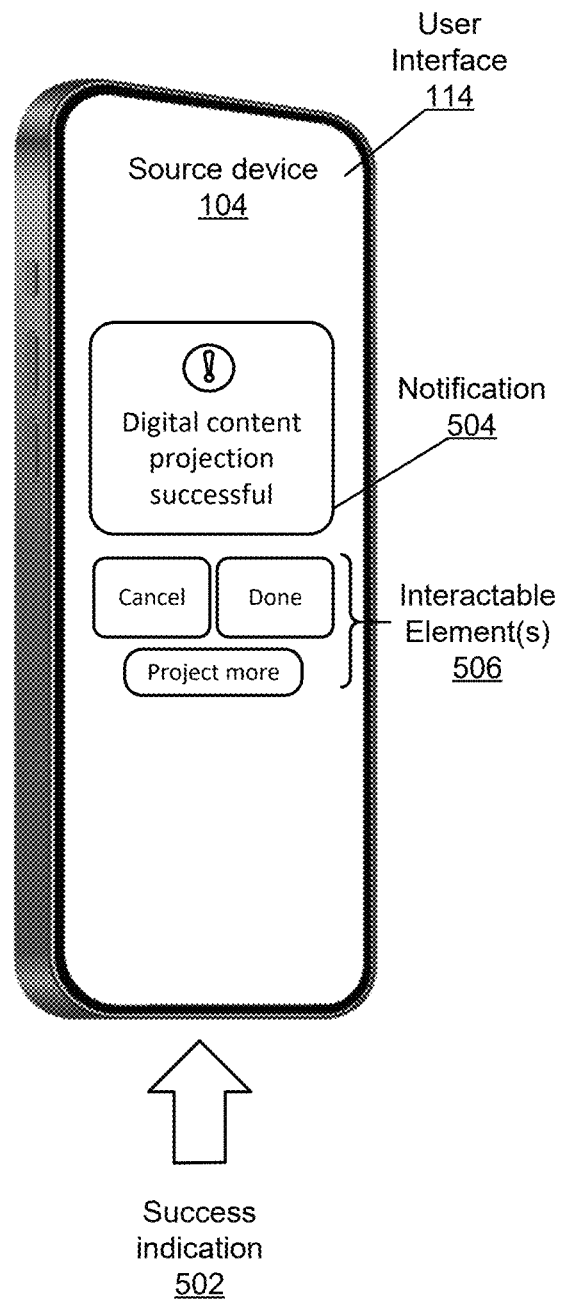
FIG. 5 illustrates an example user interface for digital content projection using sensor data in accordance with one or more implementations as described herein.

FIG. 5 illustrates an example user interface 500 for digital content projection using sensor data in accordance with one or more implementations as described herein. The example user interface 500 may implement aspects of the example system 100, the example system 200, the sensor data diagram 300, and/or the example sensor data diagram 400, as shown and described with reference to FIGS. 1 through 4. The example user interface 500 may include a source device 104 that displays a user interface 114 upon reception of a success indication 502 of digital content projection from a device (e.g., a device 102, as described with reference to FIGS. 1 through 4), where the source device 104 and the user interface 114 are examples of the corresponding devices and features as described with reference to FIGS. 1 through 4.

A device (e.g., a device 102, as described with reference to FIGS. 1 through 4) may obtain sensor input that indicates content projection from the source device 104 to a target device is successful. The device may generate a success indication 502 to transmit to the source device 104, which indicates that the digital content projection is complete. For example, the device may capture image data of a target device displaying digital content using one or more camera sensors. The device may process the image data locally using a learning model to determine that the digital content is successfully displayed at the target device. The device 102 then transmits the success indication 502 to the source device 104 via a wireless connection. Additionally, or alternatively, the device may transmit the raw image data to the source device 104 for processing in the success indication 502. Thus, the success indication 502 may be an explicit signal indicating successful projection or may be the raw sensor data for the source device 104 to process.

Upon receiving the success indication 502, the source device 104 terminates displaying the digital content 116 at the user interface 114. The source device 104 then outputs a notification 504 for display at the user interface 114 that indicates the digital content projection is complete. The notification 504 can include a text value, such as "Content projection successful." Additionally, or alternatively, the notification 504 can include a text value "Content projection successful. The content is now displayed on [Target Device Name]." The source device 104 can additionally, or alternatively, display one or more interactable elements 506 via the user interface 114. The interactable elements 506 may include a button labeled "Done" to dismiss the notification and a button labeled "Cancel" to cancel projection of the digital content, among other example interactable elements 506. Additionally, or alternatively, the interactable elements 506 may include options to project additional digital content to one or more target devices.

In some examples, the source device 104 may display additional information or controls in the user interface 114. For example, the source device 104 may show a thumbnail preview of the projected content, a progress bar indicating the duration of the projection session, or options to control the content remotely (e.g., play, pause, or stop buttons for video or audio content). The source device 104 may also display a list of recently projected content items, providing for the user to quickly select and project additional content to the same target device 106.

If the user selects an interactable element 506 to project additional digital content (e.g., "Project More"), then the source device 104 may display a content selection interface, providing for the user to choose additional digital content for projection. The content selection interface may include thumbnails of available content, a file browser, or shortcuts to frequently used applications or media sources. The source device 104 may also provide options to adjust projection settings, such as display resolution or audio output preferences, before initiating another projection session.

In some cases, the user interface 114 may include a "Cancel" option among the interactable elements 506. When selected, this option terminates the wireless connection with the target device, ending the projection session. The source device 104 may then display a confirmation message indicating that the connection has been closed and the projection session has ended. In some examples, input to the interactable elements 506 may additionally, or alternatively, be provided in the form of sensor data. For example, a device may detect additional sensor data that indicates for the source device to project additional content, cancel a projection session, and/or clear a screen at the source device 104.

Figure 6:
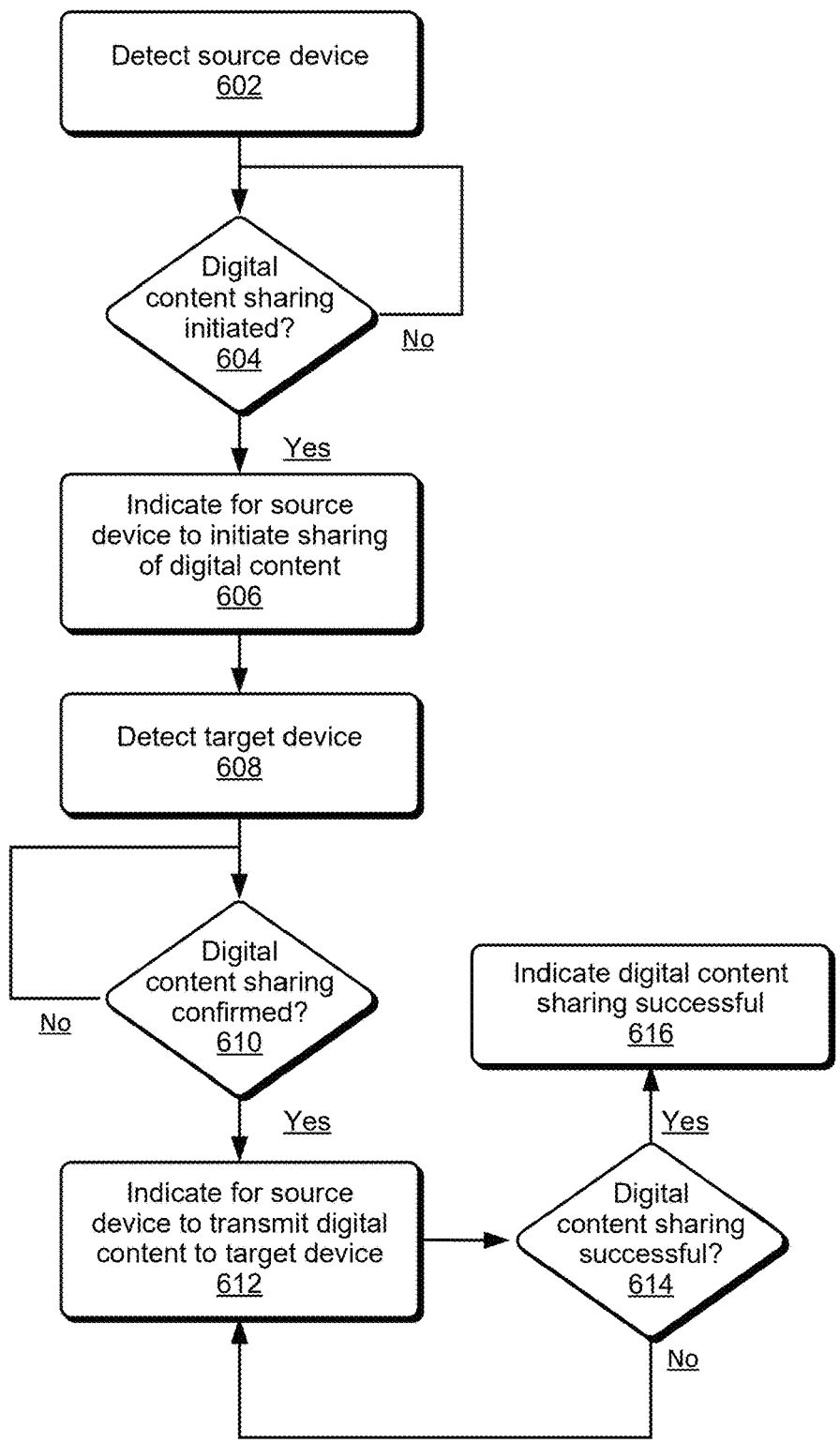
FIG. 6 further illustrates an example flowchart for digital content projection using sensor data in accordance with one or more implementations as described herein.

FIG. 6 illustrates an example flowchart 600 for digital content projection using sensor data in accordance with one or more implementations as described herein. The flowchart 600 may implement aspects of the system 100, as well as any of the system 200, the sensor data diagram 300, the sensor data diagram 400, or the user interface 500. For example, the example flowchart 600 can be implemented by a source device and/or a device, which may be an example of the device 102 and the source device 104 as described with reference to FIGS. 1 through 5. Alternative examples of the following may be implemented, where some processes are performed in a different order than described or are not performed. In some cases, processes may include additional features not mentioned below, or further processes may be added.

At 602, a source device is detected. For example, a device (e.g., a device 102, as described with reference to FIGS. 1 through 5) may capture sensor data using one or more sensors. The device may provide the sensor data (e.g., first image data) as input to one or more learning models and/or to computer vision logic to analyze the sensor data. Additionally, or alternatively, the device may transmit the sensor data to a source device for processing by the learning models and/or computer vision logic. The learning models and/or the computer vision logic may provide output that indicates a presence of the source device, as described with reference to FIG. 3. Additionally, or alternatively, the device may detect the source device through an established wireless connection (e.g., Bluetooth, UWB, or Wi-Fi).

At 604, a determination is made as to whether digital content sharing is initiated. For example, the device may capture additional sensor data (e.g., second image data) that indicates whether digital content sharing is initiated, such as sensor data that includes a gesture performed by a user. The device utilizes one or more learning models and/or computer vision logic to analyze the additional sensor data and classify the additional sensor data as a trigger condition for digital content projection. If digital content sharing is not initiated (e.g., "No"), then the process returns to 602 to continue monitoring for sensor data that is classified as a trigger condition.

At 606, if digital content sharing is initiated (e.g., "Yes"), then an indication is sent for the source device to initiate sharing of digital content. For example, the device may transmit first signaling to the source device via a wireless connection based on the additional sensor data indicating that digital content sharing is initiated. The first signaling indicates for the source device to initiate sharing of digital content to a target device.

At 608, a target device is detected. For example, the device may capture additional sensor data (e.g., third image data) of a target device using one or more sensors. The device may provide the additional sensor data as input to one or more learning models and/or to computer vision logic to analyze the additional sensor data. Additionally, or alternatively, the device may transmit the additional sensor data to a source device for processing by the learning models and/or computer vision logic. The learning models and/or the computer vision logic may provide output that indicates a presence of the target device, as described with reference to FIG. 4. Additionally, or alternatively, the device may detect the target device through an established wireless connection between the device and the target device and/or an established wireless connection between the source device and the target device.

At 610, a determination is made as to whether digital content sharing is confirmed. For example, the device may capture additional sensor data (e.g., fourth image data) that includes another trigger condition. The device utilizes one or more learning models and/or computer vision logic to analyze the additional sensor data and classify the additional sensor data as another trigger condition for digital content projection. Additionally, or alternatively, the device may transmit the additional sensor data to a source device for processing by the learning models and/or computer vision logic. If digital content sharing is not confirmed (e.g., "No"), then the process returns to 608 to continue monitoring for sensor data that indicates the digital content sharing is confirmed.

At 612, if digital content sharing is confirmed (e.g., "Yes"), an indication is sent for the source device to transmit digital content to the target device. For example, the device may transmit second signaling to the source device via the wireless connection based on the additional sensor data that triggers the digital content sharing. The second signaling indicate for the source device to transmit the digital content to the target device after initiating the sharing of the digital content.

At 614, a determination is made as to whether digital content sharing is successful. For example, the device may capture additional sensor data (e.g., fifth image data of the target device displaying the digital content) using one or more sensors. The device may process the fifth image data locally using a learning model to determine that the digital content is successfully displayed at the target device. Additionally, or alternatively, the device may transmit the additional sensor data to a source device for processing by the learning models and/or computer vision logic.

At 616, if digital content sharing is successful (e.g., "Yes"), an indication is sent to the source device that digital content sharing is successful. For example, the device may transmit a success indication to the source device via the wireless connection. The success indication may include the sensor data that indicates the content sharing is successful and/or an explicit indication that the content sharing is successful. The source device may output a notification for display at a user interface that indicates the digital content projection is complete. If digital content sharing is not successful (e.g., "No"), the process may return to 612 to retry transmitting the digital content.

The example flowchart 600, as well as example method 700, the example method 800, and the example method 900, are described with reference to respective FIGS. 6 through 9 in accordance with one or more implementations of digital content projection using sensor data, as described herein. Generally, any services, components, modules, managers, controllers, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 7:
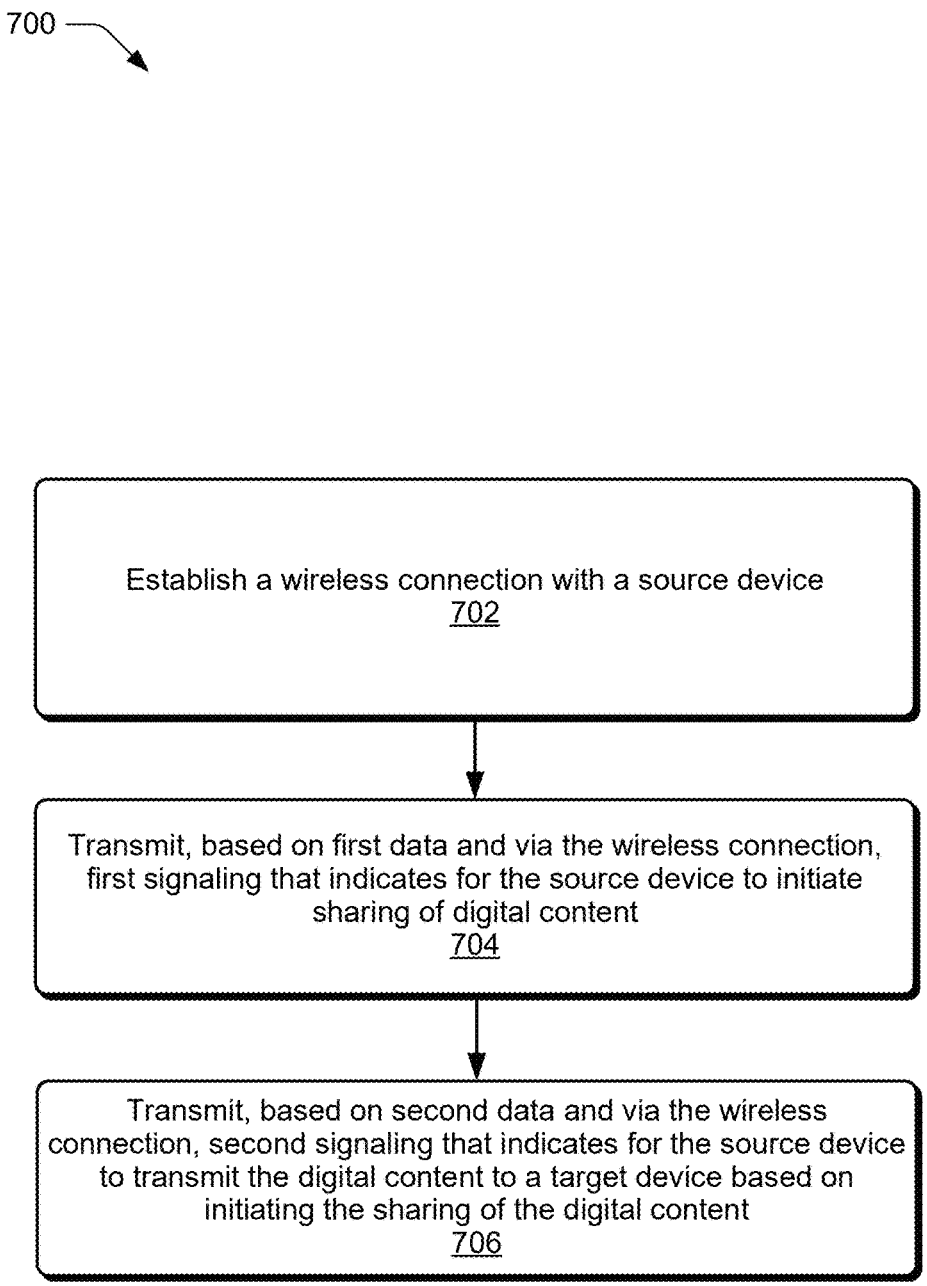
FIGS. 7 through 9 illustrate examples of methods for digital content projection using sensor data in accordance with one or more implementations of the techniques described herein.

FIG. 7 illustrates one or more example methods 700 for digital content projection using sensor data. The order in which the method is described is not intended to be construed as a limitation, and any number or combination of the described method operations can be performed in any order to perform a method, or an alternate method.

At 702, a wireless connection is established with a source device. For example, a device (e.g., a first device, a wearable device) establishes a wireless connection, including a Bluetooth, UWB, Wi-Fi, cellular, or other wireless connection, with the source device (e.g., a second device).

At 704, first signaling is transmitted to the source device via the wireless connection based on first data obtained by one or more sensors. The first signaling indicates for the source device to initiate sharing of digital content (e.g., to a third device, referred to as a target device). For example, a device transmits first signaling including an explicit indication for the source device to initiate the sharing of the digital content. In some other examples, the device transmits the first data to the source device, and the source device processes the first data to determine to initiate the sharing of the digital content to the target device. That is, in some cases, the device processes the first data locally, and in some other cases, the device transmits the first data to the source device to process.

At 706, second signaling is transmitted to the source device via the wireless connection based on second data obtained by the sensors. The second signaling indicates for the source device to transmit the digital content to the target device based on (e.g., after, upon) initiating the sharing of the digital content. For example, a device transmits second signaling including an explicit indication for the source device to transmit the digital content to the target device. In some other examples, the device transmits the second data to the source device, and the source device processes the second data to determine to initiate the sharing of the digital content to the target device. That is, in some cases, the device processes the second data locally, and in some other cases, the device transmits the second data to the source device to process.

In some cases, the sensors include at least one camera sensor, the first data is first image data that includes a first gesture (e.g., a pinch gesture), and the second data is second image data that includes a second gesture (e.g., a release or drop gesture). For example, a user may make a pinch gesture when facing a source device, and then may turn to the target device and make a release gesture to illustrate moving the digital content from the source device to the target device. In some examples, the device or the source device train one or more learning models (machine learning models, artificial intelligence models, neural networks, etc.) to classify data obtained by the one or more sensors into respective categories (e.g., trigger conditions, classification categories) that trigger transmission of different types of signaling.

In some cases, the source device and/or the device provides the first data as input to the learning model. The source device or the device obtain a first category (e.g., a first gesture for image data of a user) as output from the learning model that triggers the first signaling. Additionally, or alternatively, the source device and/or the device provides the second data as input to the learning model. The source device or the device obtain a second category (e.g., a second gesture for image data of a user) as output from the learning model that triggers the second signaling.

In some examples, the one or more sensors obtain third data. The device transmits third signaling via the wireless connection based on the third data. The third signaling indicates to the source device that the sharing of the digital content is complete. In some cases, the device and the source device are a same device. In some other cases, the device and the source device are different devices. In some variations, the first data and/or the second data indicates the target device. For example, if the first data and the second data include image data, then the data may include an image of a user dropping the digital content at the target device. The device or the source device can detect the target device from the image and/or via a wireless connection with the target device.

In some examples, the device is a wearable device, and the first data includes one or more of an indication of a user focus on the source device or a first gesture associated at least in part with the source device (e.g., a gesture in the vicinity of the source device or identifying the source device). Additionally, or alternatively, the second data comprises one or more of an indication of a user focus on the target device or a second gesture associated at least in part with the target device (e.g., a gesture in the vicinity of the target device or identifying the target device).

Figure 8:
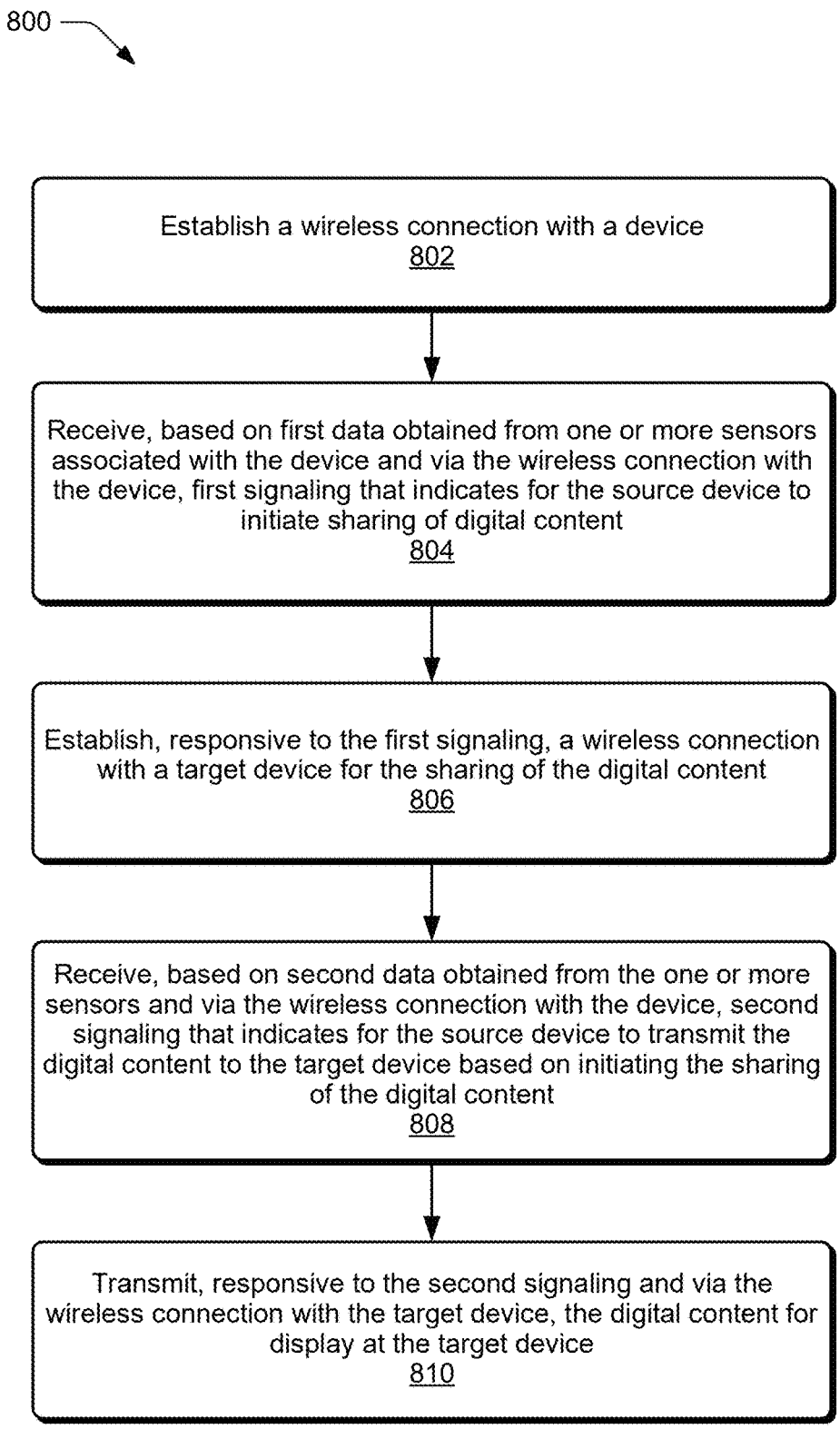

FIG. 8 illustrates one or more example methods 800 for digital content projection using sensor data. The order in which the method is described is not intended to be construed as a limitation, and any number or combination of the described method operations can be performed in any order to perform a method, or an alternate method.

At 802, a wireless connection is established with a device. For example, a source device (e.g., a first device) establishes a wireless connection, such as Bluetooth, UWB, Wi-Fi, cellular, or other wireless connection, with the device (e.g., a second device, which may be a wearable device).

At 804, first signaling is received via the wireless connection with the device based on first data obtained from one or more sensors associated with the device. The first signaling indicates for the source device to initiate sharing of digital content (e.g., to a third device, also referred to as a target device). For example, the device may transmit first signaling to the source device including an explicit indication for the source device to initiate the sharing of the digital content. In some other examples, the device transmits the first data to the source device, and the source device processes the first data to determine to initiate the sharing of the digital content to the target device.

At 806, responsive to the first signaling, a wireless connection is established with the target device for the sharing of the digital content. The source device may establish the connection using various wireless technologies such as Wi-Fi, UWB, Bluetooth, cellular, or other wireless connection.

At 808, second signaling is received via the wireless connection with the device based on second data obtained from the one or more sensors. The second signaling indicates for the source device to transmit the digital content to the target device based on initiating the sharing of the digital content. The second signaling may be an explicit indication or may require processing of the second data by the source device.

At 810, responsive to the second signaling, the digital content is transmitted for display at the target device via the wireless connection with the target device. For example, the source device transmits the digital content to the target device.

In some examples, the source device trains a learning model to classify data obtained by the one or more sensors into respective categories that trigger transmission of different types of signaling. The source device may then transmit this trained learning model to the device via the wireless connection, enabling the device to perform local processing of sensor data. Additionally, or alternatively, the source device may implement the trained learning models to process sensor data received from the device. In some cases, the source device may receive third signaling via the wireless connection with the device based on third data obtained from the one or more sensors. The third signaling indicates to the source device that the sharing of the digital content is complete. Upon receiving the third signaling, the source device may terminate the display of the digital content at the source device, if applicable.

Figure 9:
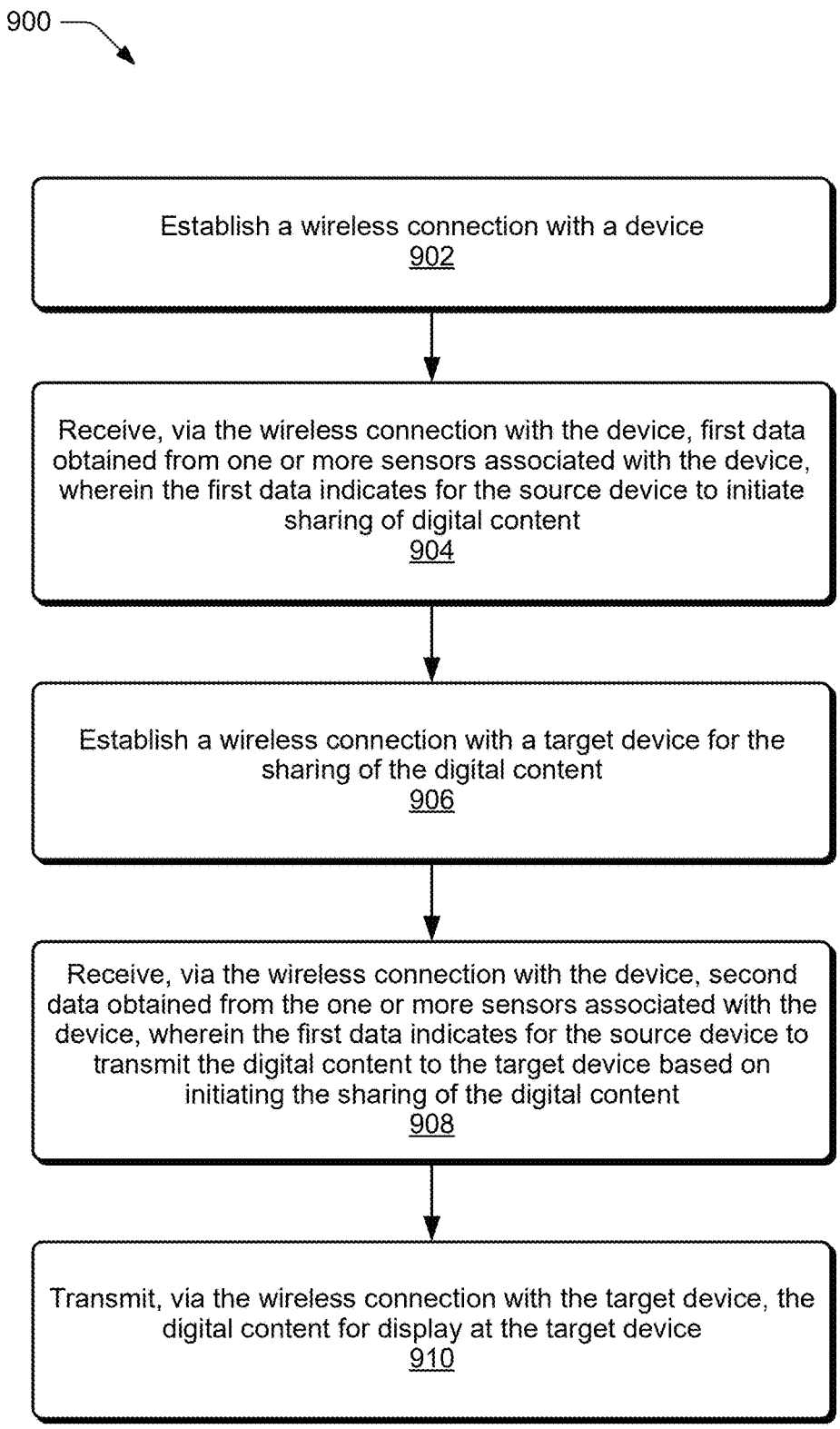

FIG. 9 illustrates one or more example methods 900 for digital content projection using sensor data. The order in which the method is described is not intended to be construed as a limitation, and any number or combination of the described method operations can be performed in any order to perform a method, or an alternate method.

At 902, a wireless connection is established with a device. For example, a source device (e.g., a first device) establishes a wireless connection, such as Bluetooth, UWB, Wi-Fi, cellular, or other wireless connection, with the device (e.g., a second device, which may be a wearable device).

At 904, first data obtained from one or more sensors associated with the device is received via the wireless connection. For example, the device obtains the first data and transmits the first data to the source device. The first data indicates for the source device to initiate sharing of digital content (e.g., to a third device, which may be referred to as a target device). In some examples, the first data includes first image data corresponding to a first gesture captured by at least one camera sensor associated with the device.

At 906, responsive to the first data, a wireless connection is established with the target device for the sharing of the digital content. For example, the source device establishes a wireless connection with the target device. The wireless connection may be established using various wireless technologies such as Wi-Fi, UWB, Bluetooth, cellular, or other wireless connection.

At 908, second data obtained from the one or more sensors associated with the device is received via the wireless connection with the device. For example, the source device receives the second data from the device. The second data indicates for the source device to transmit the digital content to the target device based on initiating the sharing of the digital content. In some examples, the second data includes second image data corresponding to a second gesture captured by the at least one camera sensor.

At 910, responsive to the second data, the digital content is transmitted via the wireless connection with the target device for display at the target device. For example, the source device transmits the digital content to the target device, and the target device displays the digital content.

In some cases, the source device is configured to train a learning model to classify data obtained by the one or more sensors associated with the device into respective categories that trigger transmission of different types of signaling. For example, to establish the wireless connection with the target device, the source device may provide the first data as input to the learning model and obtain, as output from the learning model, a first category that triggers the establishing of the wireless connection with the target device. Similarly, to transmit the digital content, the source device may provide the second data as input to the learning model and obtain, as output from the learning model, a second category that triggers the transmitting of the digital content.

In some examples, the source device receives third data obtained from the one or more sensors associated with the device via the wireless connection with the device. The third data indicates that the sharing of the digital content is complete. Upon receiving this third data, the source device may terminate the display of the digital content at the source device, if applicable.

Figure 10:
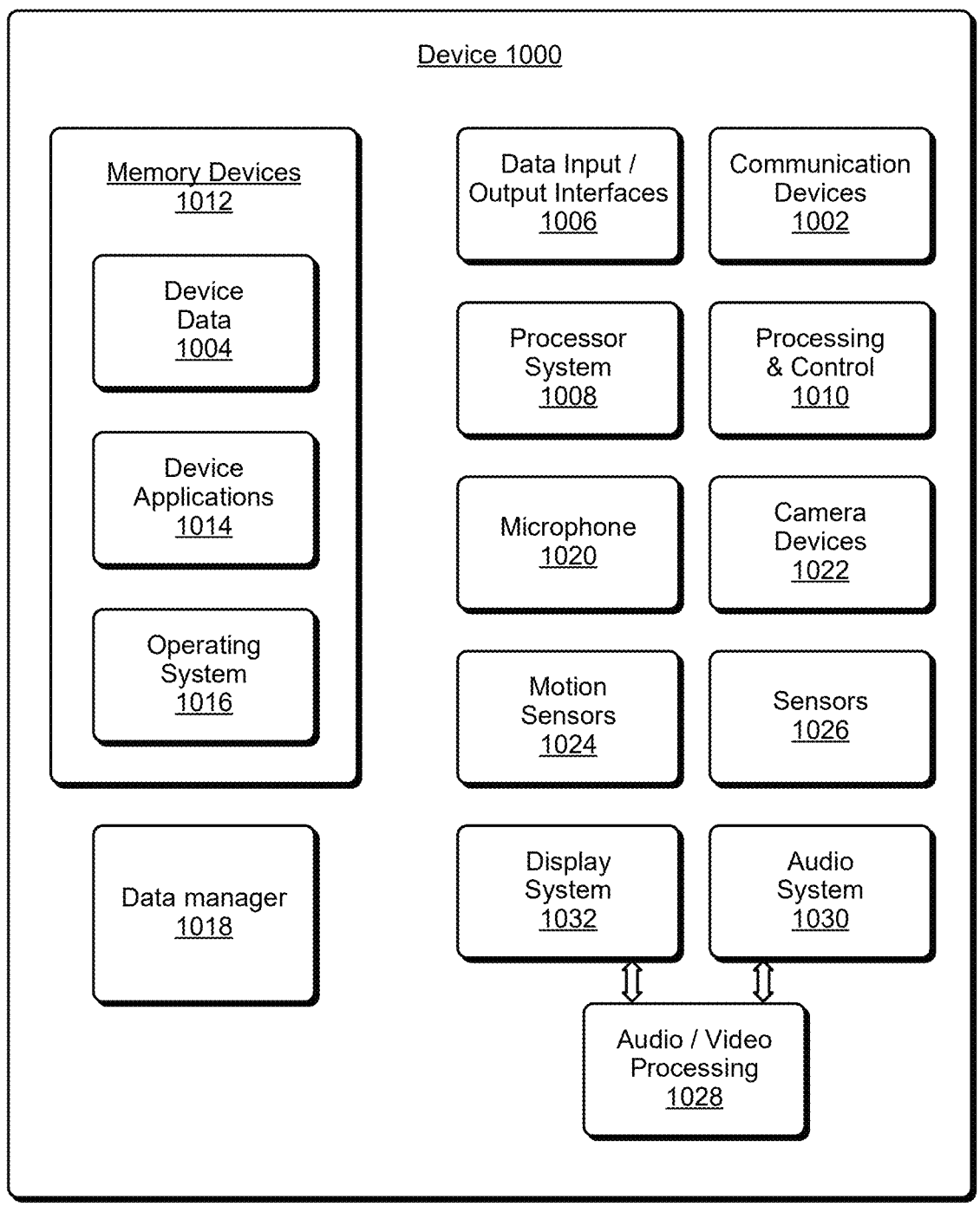
FIG. 10 illustrates various components of an example device that can be used to implement the techniques for digital content projection using sensor data as described herein.

FIG. 10 illustrates various components of an example device 1000, which can implement aspects of the techniques and features for digital content projection using sensor data, as described herein. The example device 1000 can be implemented as any of the devices described with reference to the previous FIGS. 1 through 9, such as any type of a wireless device, mobile device, mobile phone, flip phone, client device, companion device, paired device, display device, tablet, wearable device, computing, communication, entertainment, gaming, media playback, and/or any other type of computing, consumer, and/or electronic device. For example, the device 102, the source device 104, and/or the target device 106 described with reference to FIGS. 1 through 9 may be implemented as the example device 1000.

The example device 1000 can include various, different communication devices 1002 that enable wired and/or wireless communication of device data 1004 with other devices. The device data 1004 can include any of the various device's data and content that is generated, processed, determined, received, stored, and/or communicated from one computing device to another. Generally, the device data 1004 can include any form of audio, video, image, graphics, and/or electronic data that is generated by applications executing on a device. The communication devices 1002 can also include transceivers for cellular phone communication and/or for any type of network data communication.

The example device 1000 can also include various, different types of data input/output (I/O) interfaces 1006, such as data network interfaces that provide connection and/or communication links between the devices, data networks, and other devices. The I/O interfaces 1006 can be used to couple the device to any type of components, peripherals, and/or accessory devices, such as a computer input device that may be integrated with the example device 1000. The I/O interfaces 1006 may also include data input ports via which any type of data, information, media content, communications, messages, and/or inputs can be received, such as user inputs to the device, as well as any type of audio, video, image, graphics, and/or electronic data received from any content and/or data source.

The example device 1000 includes a processor system 1008 of one or more processors (e.g., any of microprocessors, controllers, and the like) and/or a processor and memory system implemented as a system-on-chip (SoC) that processes computer-executable instructions. The processor system 1008 may be implemented at least partially in computer hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively, or in addition, the device can be implemented with any one or combination of software, hardware, firmware, or fixed logic circuitry that may be implemented in connection with processing and control circuits, which are generally identified as processing and control 1010. The example device 1000 may also include any type of a system bus or other data and command transfer system that couples the various components within the device. A system bus can include any one or combination of different bus structures and architectures, as well as control and data lines.

The example device 1000 also includes memory and/or memory devices 1012 (e.g., computer-readable storage memory) that enable data storage, such as data storage devices implemented in hardware which can be accessed by a computing device, and that provide persistent storage of data and executable instructions (e.g., software applications, programs, functions, and the like). Examples of the memory devices 1012 include volatile memory and non-volatile memory, fixed and removable media devices, and any suitable memory device or electronic data storage that maintains data for computing device access. The memory devices 1012 can include various implementations of random-access memory (RAM), read-only memory (ROM), flash memory, and other types of storage media in various memory device configurations. The example device 1000 may also include a mass storage media device.

The memory devices 1012 (e.g., as computer-readable storage memory) provide data storage mechanisms, such as to store the device data 1004, other types of information and/or electronic data, and various device applications 1014 (e.g., software applications and/or modules). For example, an operating system 1016 can be maintained as software instructions with a memory device 1012 and executed by the processor system 1008 as a software application. The device applications 1014 may also include a device manager, such as any form of a control application, software application, signal-processing and control module, code that is specific to a particular device, a hardware abstraction layer for a particular device, and so on.

In this example, the device 1000 includes a data manager 1018 that implements various aspects of the described features and techniques described herein. The data manager 1018 can be implemented with hardware components and/or in software as one of the device applications 1014, such as when the example device 1000 is implemented as the device 102 described with reference to FIGS. 1 through 9. An example of the data manager 1018 is the data manager 124 and the data manager 126 implemented in the device 102 and the source device 104, respectively, such as a software application and/or as hardware components in the wireless device. In one or more implementations, the data manager 1018 may include independent processing, memory, and logic components as a computing and/or electronic device integrated with the example device 1000.

The example device 1000 can also include a microphone 1020 and/or camera devices 1022, as well as proximity and/or motion sensors 1024, such as may be implemented as components of an inertial measurement unit (IMU), and geographical location information sensors (e.g., GPS to obtain a current geographic location of the client device or a user of the client device). The proximity and/or motion sensors 1024 can be implemented with various sensors 1026, such as a gyroscope, an accelerometer, and/or other types of motion sensors to sense motion of the device. The motion sensors 1024 can generate sensor data vectors having three-dimensional parameters (e.g., rotational vectors in x, y, and z-axis coordinates) indicating location, position, acceleration, rotational speed, and/or orientation of the device. The example device 1000 can also include one or more power sources, such as when the device is implemented as a wireless device and/or a device 102. The power sources may include a charging and/or power system, and can be implemented as a flexible strip battery, a rechargeable battery, a charged super-capacitor, and/or any other type of active or passive power source.

The example device 1000 can also include an audio and/or video processing system 1028 that generates audio data for an audio system 1030 and/or generates display data for a display system 1032. The audio system and/or the display system may include any types of devices or modules that generate, process, display, and/or otherwise render audio, video, display, and/or image data. Display data and audio signals can be communicated to an audio component and/or to a display component via any type of audio and/or video connection or data link. In one or more implementations, the audio system and/or the display system are integrated components of the example device 1000. Alternatively, the audio system and/or the display system are external, peripheral components to the example device.

In some aspects, the techniques described herein relate to a first device including at least one memory, and at least one processor coupled with the at least one memory and configured to cause the first device to establish a wireless connection with a second device, transmit, based on first data and via the wireless connection, first signaling that indicates for the second device to initiate sharing of digital content, and transmit, based on second data and via the wireless connection, second signaling that indicates for the second device to transmit the digital content to a third device based on initiating the sharing of the digital content.

In some aspects, the techniques described herein relate to a first device, where the first device further includes one or more sensors, and where the one or more sensors include at least one camera sensor, the first data includes first image data corresponding to a first gesture, and the second data includes second image data corresponding to a second gesture.

In some aspects, the techniques described herein relate to a first device, where the at least one processor is further configured to cause the first device to train a learning model to classify data obtained by the one or more sensors into respective categories that trigger transmission of different types of signaling.

In some aspects, the techniques described herein relate to a first device, where, to transmit the second signaling, the at least one processor is configured to cause the first device to provide, as input to the learning model, the first data, and obtain, as output from the learning model, a first category that triggers the first signaling.

In some aspects, the techniques described herein relate to a first device, where to transmit the second signaling, the at least one processor is configured to cause the first device to provide, as input to the learning model, the second data, and obtain, as output from the learning model, a second category that triggers the second signaling.

In some aspects, the techniques described herein relate to a first device, where the at least one processor is further configured to cause the first device to transmit, based on the third data and via the wireless connection, third signaling that indicates to the second device that the sharing of the digital content is complete.

In some aspects, the techniques described herein relate to a first device, where the first device is a same device as the second device.

In some aspects, the techniques described herein relate to a first device, where the first device and the second device are different devices.

In some aspects, the techniques described herein relate to a first device, where the first device is a wearable device, and where the first data includes one or more of an indication of a user focus on the second device or a first gesture associated at least in part with the second device, and the second data includes one or more of an indication of a user focus on the third device or a second gesture associated at least in part with the third device.

In some aspects, the techniques described herein relate to a first device including at least one memory, and at least one processor coupled with the at least one memory and configured to cause the first device to establish a wireless connection with a second device, receive, based on first data obtained from one or more sensors associated with the second device and via the wireless connection with the second device, first signaling that indicates for the first device to initiate sharing of digital content, establish, responsive to the first signaling, a wireless connection with a third device for the sharing of the digital content, receive, based on second data obtained from the one or more sensors and via the wireless connection with the second device, second signaling that indicates for the first device to transmit the digital content to the third device based on initiating the sharing of the digital content, and transmit, responsive to the second signaling and via the wireless connection with the third device, the digital content for display at the third device.

In some aspects, the techniques described herein relate to a first device, where the at least one processor is further configured to cause the first device to train a learning model to classify data obtained by the one or more sensors into respective categories that trigger transmission of different types of signaling, and transmit, via the wireless connection with the second device, the learning model.

In some aspects, the techniques described herein relate to a first device, where at least one processor is further configured to cause the first device to receive, based on third data obtained from the one or more sensors and via the wireless connection with the second device, third signaling that indicate to the first device that the sharing of the digital content is complete.

In some aspects, the techniques described herein relate to a first device, where the at least one processor is further configured to cause the first device to terminate, responsive to the third signaling, display of the digital content at the first device.

In some aspects, the techniques described herein relate to a first device including at least one memory, and at least one processor coupled with the at least one memory and configured to cause the first device to establish a wireless connection with a second device, receive, via the wireless connection with the second device, first data obtained from one or more sensors associated with the second device, where the first data indicates for the source device to initiate sharing of digital content, establish a wireless connection with a third device for the sharing of the digital content, receive, via the wireless connection with the second device, second data obtained from the one or more sensors associated with the second device, where the first data indicates for the first device to transmit the digital content to the third device based on initiating the sharing of the digital content, and transmit, via the wireless connection with the third device, the digital content for display at the third device.

In some aspects, the techniques described herein relate to a first device, where the one or more sensors include at least one camera sensor, and where the first data includes first image data corresponding to a first gesture and the second data includes second image data corresponding to a second gesture.

In some aspects, the techniques described herein relate to a first device, where the at least one processor is further configured to cause the first device to train a learning model to classify data obtained by the one or more sensors associated with the second device into respective categories that trigger transmission of different types of signaling.

In some aspects, the techniques described herein relate to a first device, where, to establish the wireless connection with the third device, the at least one processor is configured to cause the first device to provide, as input to the learning model, the first data, and obtain, as output from the learning model, a first category that triggers the establishing of the wireless connection with the third device.

In some aspects, the techniques described herein relate to a first device, where to transmit the digital content, the at least one processor is configured to cause the first device to provide, as input to the learning model, the second data, and obtain, as output from the learning model, a second category that triggers the transmitting of the digital content.

In some aspects, the techniques described herein relate to a first device, where the at least one processor is further configured to cause the first device to receive, via the wireless connection with the second device, third data obtained from the one or more sensors associated with the second device, where the third data indicates that the sharing of the digital content is complete.

In some aspects, the techniques described herein relate to a first device, where the at least one processor is further configured to cause the first device to terminate, responsive to the third data, display of the digital content at the first device.

The invention claimed is:

1. A first device comprising:
   at least one memory; and
   at least one processor coupled with the at least one memory and configured to cause the first device to:
   establish a wireless connection with a second device;
   transmit, based on first data and via the wireless connection and based on first image data corresponding to a first gesture, a first signaling that indicates for the second device to initiate sharing of digital content;
   transmit, based on second data and via the wireless connection and based on second image data corresponding to a second gesture, a second signaling that indicates for the second device to transmit the digital content to a third device based on initiating the sharing of the digital content; and
   transmit, via the wireless connection and based on third image data, a third signaling that indicates to the second device that the sharing of the digital content is complete.

2. The first device of claim 1, wherein the first device further comprises one or more sensors, and wherein: the one or more sensors comprise at least one camera sensor; the first data includes first image data corresponding to a first gesture; and the second data includes second image data corresponding to a second gesture third image data corresponds to at least one of a third gesture that indicates the sharing of the digital content is complete or the third device displaying the digital content.

3. The first device of claim 1, wherein the at least one processor is further configured to cause the first device to train a learning model to classify data obtained by the one or more sensors a sensor into respective categories that trigger transmission of different types of signaling, wherein the sensor is a camera sensor configured to capture image data.

4. The first device of claim 3, wherein, to transmit the second signaling, the at least one processor is configured to cause the first device to:
   provide, as input to the learning model, the first image data; and
   obtain, as output from the learning model, a first category that triggers the first signaling.

5. The first device of claim 3, wherein to transmit the second signaling, the at least one processor is configured to cause the first device to:
   provide, as input to the learning model, the second image data; and
   obtain, as output from the learning model, a second category that triggers the second signaling.

6. The first device of claim 3, wherein the at least one processor is further configured to cause the first device to transmit, based on the third data and via the wireless connection, third signaling that indicates to the second device that the sharing of the digital content is complete to;

provide, as input to the learning model, the third image data; and obtain, as output from the learning model, a category that triggers the third signaling.

7. The first device of claim 1, wherein the first device is a same wearable device, wherein the second device is a mobile device, and wherein the third device is a display device.

8. The first device of claim 1, wherein the first device and the second device are different devices.

9. The first device of claim 1, wherein the first device is a wearable device, and wherein: the first image data comprises one or more of an indication of a user focus on the second device or the first gesture associated at least in part with the second device, and wherein the second image data comprises one or more of an indication of a user focus on the third device or the second gesture associated at least in part with the third device.

10. A first device comprising:
at least one memory; and
at least one processor coupled with the at least one memory and configured to cause the first device to:
establish a wireless connection with a second device;
receive, based on first image data obtained from one or more sensors a sensor associated with the second device and via the wireless connection with the second device, a first signaling that indicates for the first device to initiate sharing of digital content, wherein the first image data corresponds to a first gesture;
establish, responsive to the first signaling, a wireless connection with a third device for the sharing of the digital content;
receive, based on second image data obtained from the one or more sensors sensor and via the wireless connection with the second device, a second signaling that indicates for the first device to transmit the digital content to the third device based on initiating the sharing of the digital content, wherein the second image data corresponds to a second gesture;
transmit, responsive to the second signaling and via the wireless connection with the third device, the digital content for display at the third device; and
receive, based on third image data obtained from the sensor and via the wireless connection with the second device, a third signaling that indicates to the first device that the sharing of the digital content is complete.

11. The first device of claim 10, wherein the at least one processor is further configured to cause the first device to:
train a learning model to classify data obtained by the one or more sensors sensor into respective categories that trigger transmission of different types of signaling, wherein the sensor is configured to capture image data; and
transmit, via the wireless connection with the second device, the learning model.

12. The first device of claim 10, wherein at least one processor is further configured to cause the first device to receive, based on third data obtained from the one or more sensors and via the wireless connection with the second device, third signaling that indicate to the first device that the sharing of the digital content is complete the third image data corresponds to at least one of a third gesture that indicates the sharing of the digital content is complete or the third device displaying the digital content.

13. The first device of claim 10, wherein the at least one processor is further configured to cause the first device to terminate, responsive to the third signaling, display of the digital content at the first device.

14. A first device comprising:
at least one memory; and
at least one processor coupled with the at least one memory and configured to cause the first device to:
establish a wireless connection with a second device;
receive, via the wireless connection with the second device, first image data obtained from one or more sensors a sensor associated with the second device, wherein the first image data corresponds to a first gesture that indicates for the source first device to initiate sharing of digital content;
establish a wireless connection with a third device for the sharing of the digital content;
receive, via the wireless connection with the second device, second image data obtained from the one or more sensors sensor associated with the second device, wherein the second image data corresponds to a second gesture that indicates for the first device to transmit the digital content to the third device based on initiating the sharing of the digital content;
transmit, via the wireless connection with the third device, the digital content for display at the third device; and
receive, via the wireless connection with the second device, third image data obtained from the sensor associated with the second device, wherein the third image data indicates that the sharing of the digital content is complete.

15. The first device of claim 14, wherein the one or more sensors comprise at least one camera sensor, and wherein the first data includes first image data corresponding to a first gesture and the second data includes second image data corresponding to a second gesture third image data corresponds to at least one of a third gesture that indicates the sharing of the digital content is complete or the third device displaying the digital content.

16. The first device of claim 14, wherein the at least one processor is further configured to cause the first device to train a learning model to classify data obtained by the one or more sensors sensor associated with the second device into respective categories that trigger transmission of different types of signaling, wherein the sensor includes a camera sensor.

17. The first device of claim 16, wherein, to establish the wireless connection with the third device, the at least one processor is configured to cause the first device to:
provide, as input to the learning model, the first image data; and
obtain, as output from the learning model, a first category that triggers the establishing of the wireless connection with the third device.

18. The first device of claim 16, wherein to transmit the digital content, the at least one processor is configured to cause the first device to:
provide, as input to the learning model, the second image data; and
obtain, as output from the learning model, a second category that triggers the transmitting of the digital content.

19. The first device of claim 16, wherein the at least one processor is further configured to cause the first device to receive, via the wireless connection with the second device, third data obtained from the one or more sensors associated with the second device, wherein the third data indicates that the sharing of the digital content is complete to:

provide, as input to the learning model, the third image data; and obtain, as output from the learning model, a category that indicates that the sharing of the digital content is complete.

20. The first device of claim 14, wherein the at least one processor is further configured to cause the first device to terminate, responsive to the third image data, display of the digital content at the first device.

* * * * *